(12) United States Patent
Odenwald

(10) Patent No.: US 6,671,727 B1
(45) Date of Patent: *Dec. 30, 2003

(54) METHODOLOGY FOR PROVIDING PERSISTENT TARGET IDENTIFICATION IN A FIBRE CHANNEL ENVIRONMENT

(75) Inventor: Louis Odenwald, Witchita, KS (US)

(73) Assignee: LSI Logic Corporation, Milpitas, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/467,461

(22) Filed: Dec. 20, 1999

(51) Int. Cl.⁷ ............................................. G06F 13/00
(52) U.S. Cl. ...................... 709/227; 709/228; 709/229; 709/245; 370/351
(58) Field of Search ............................. 709/227, 228, 709/229, 245; 370/351

(56) References Cited

U.S. PATENT DOCUMENTS

| | | | |
|---|---|---|---|
| 5,598,541 A | | 1/1997 | Malladi |
| 5,768,530 A | | 6/1998 | Sandorfi |
| 5,842,040 A | | 11/1998 | Hughes et al. |
| 5,848,251 A | | 12/1998 | Lomelino et al. |
| 5,954,796 A | * | 9/1999 | McCarty et al. ............ 709/222 |
| 5,956,723 A | | 9/1999 | Zhu ............................. 707/100 |
| 5,978,379 A | * | 11/1999 | Chan et al. ................. 370/403 |
| 5,983,309 A | * | 11/1999 | Atsatt et al. ..................... 711/4 |
| 6,057,863 A | | 5/2000 | Olarig |
| 6,130,892 A | * | 10/2000 | Short et al. .................. 370/401 |
| 6,138,161 A | * | 10/2000 | Reynolds et al. ........... 709/227 |
| 6,141,731 A | | 10/2000 | Beardsley |
| 6,195,703 B1 | * | 2/2001 | Blumenau et al. .......... 709/238 |
| 6,195,705 B1 | * | 2/2001 | Leung ......................... 709/245 |
| 6,199,112 B1 | * | 3/2001 | Wilson ........................ 709/227 |
| 6,269,099 B1 | * | 7/2001 | Borella et al. .............. 370/389 |
| 6,401,128 B1 | * | 6/2002 | Stai et al. .................... 709/236 |
| 6,418,476 B1 | * | 7/2002 | Luciani ....................... 709/238 |
| 6,421,711 B1 | * | 7/2002 | Blumenau et al. .......... 709/213 |
| 6,421,723 B1 | * | 7/2002 | Tawil .......................... 709/224 |
| 6,421,753 B1 | * | 7/2002 | Hoese et al. ................ 710/305 |
| 6,425,034 B1 | | 7/2002 | Steinmetz |
| 6,430,645 B1 | * | 8/2002 | Basham ...................... 710/305 |
| 6,484,200 B1 | * | 11/2002 | Angal et al. ................ 709/224 |
| 6,510,450 B1 | * | 1/2003 | Ricart et al. ................ 709/203 |
| 6,578,087 B1 | * | 6/2003 | Garakani et al. ........... 709/242 |

* cited by examiner

Primary Examiner—Robert B. Harrell
Assistant Examiner—M H P
(74) Attorney, Agent, or Firm—Christopher P. Maiorana, PC

(57) ABSTRACT

An apparatus comprising a first circuit and a second circuit. The first circuit may be configured to (i) generate a sorted list of permanent unique identifiers according to predetermined criteria and (ii) associate a logical identification with a physical address identifier using the sorted list. The second circuit may be configured to manage communications between a host and a target. The second circuit may (i) communicate with the host using the logical identification and (ii) communicate with the target using the physical address identifier. The communications between the host and the target may be unaffected by changes in the physical address identifier. The function of the first circuit and/or the second circuit may be implemented, among other examples, in software and/or firmware.

22 Claims, 4 Drawing Sheets

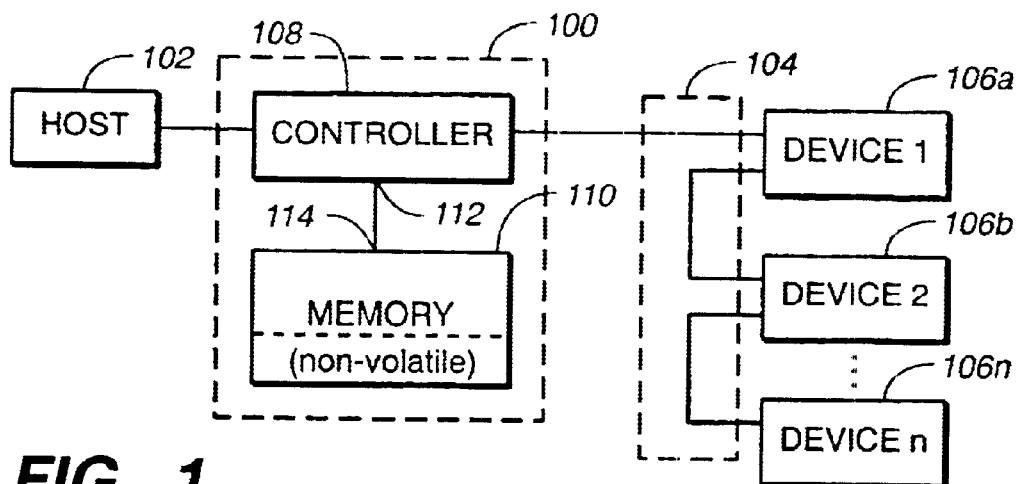
FIG._1
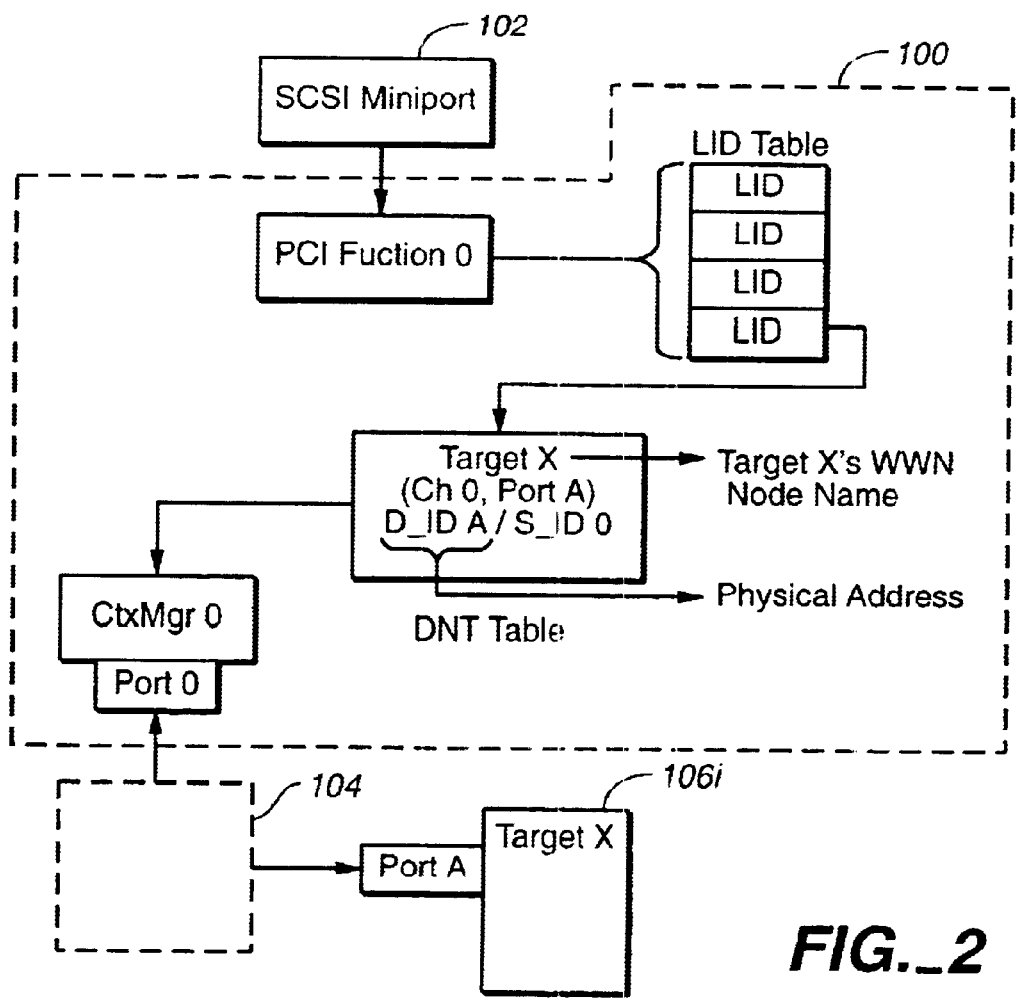
FIG._2

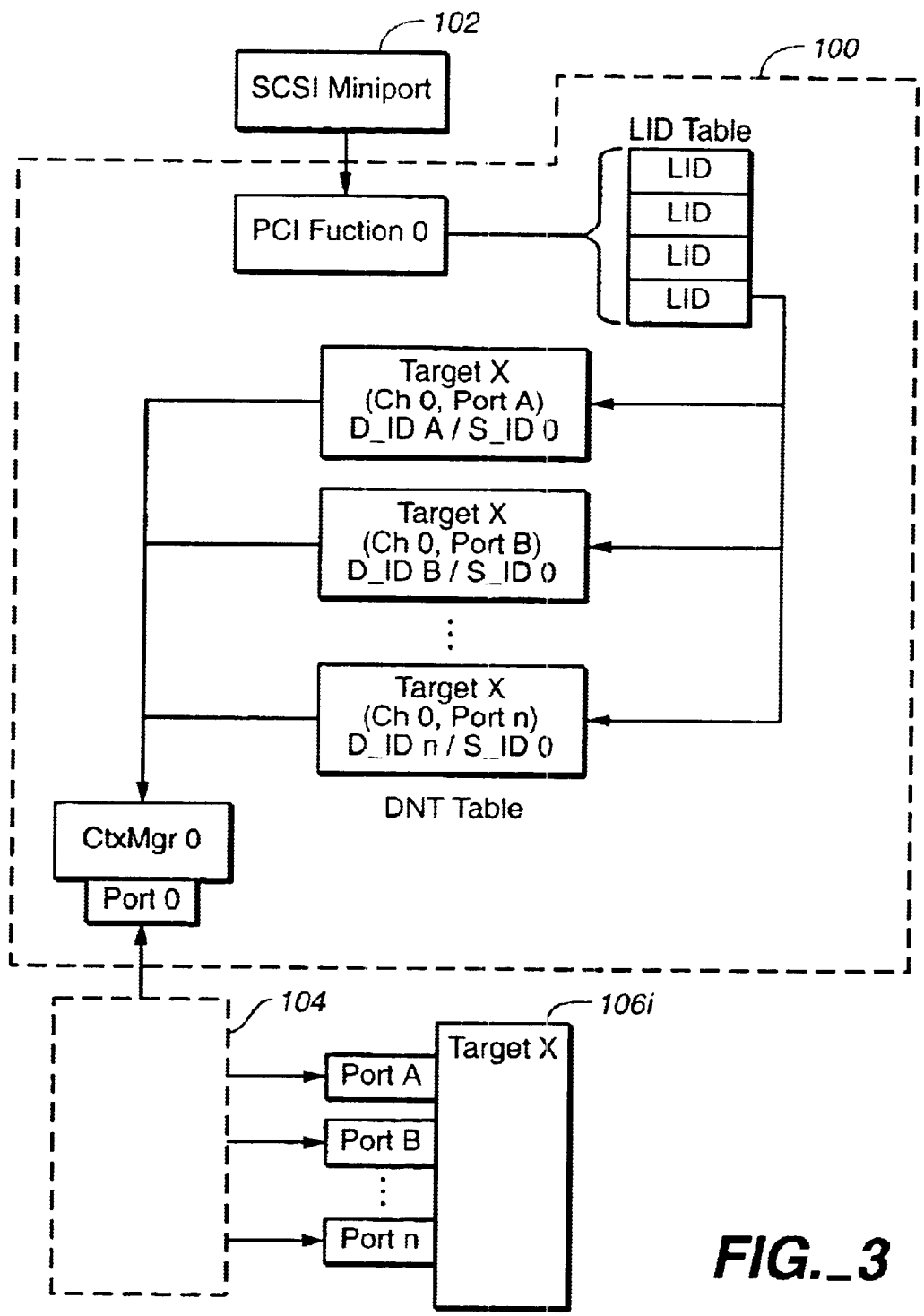
FIG._3

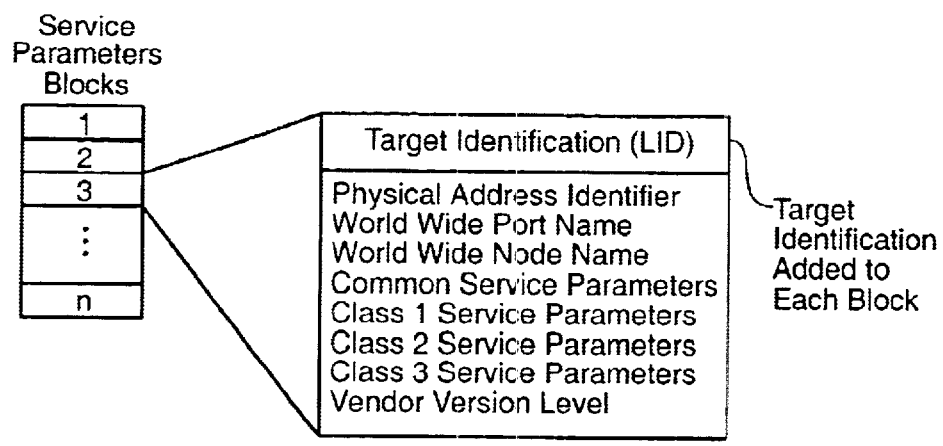
FIG._4A
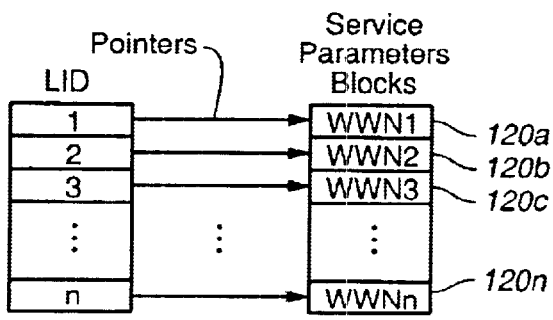
FIG._4B
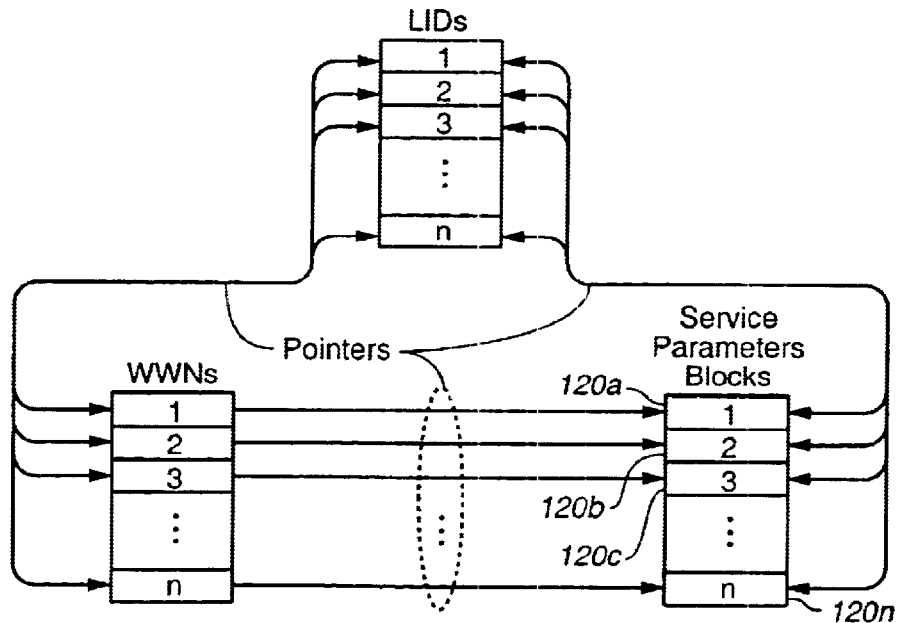
FIG._4C

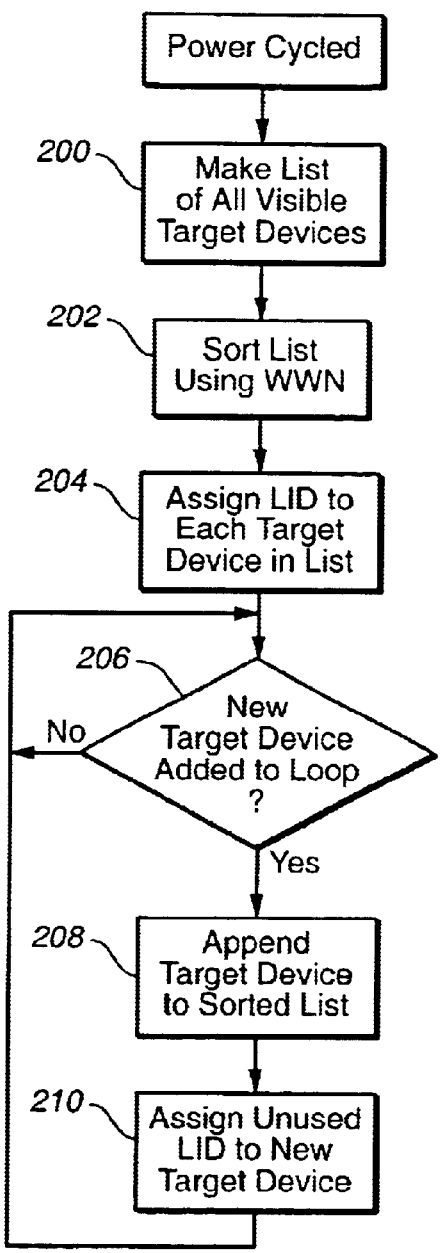
FIG._5
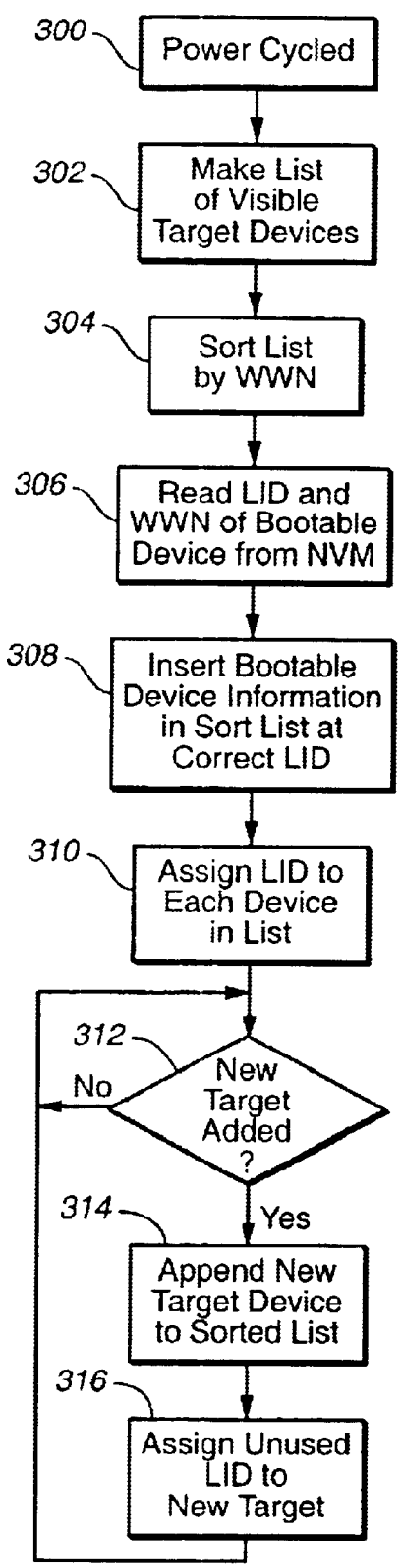
FIG._6

METHODOLOGY FOR PROVIDING PERSISTENT TARGET IDENTIFICATION IN A FIBRE CHANNEL ENVIRONMENT

FIELD OF THE INVENTION

The present invention relates to computer networks generally and, more particularly, to a methodology for providing persistent target identification in a Fibre Channel environment.

BACKGROUND OF THE INVENTION

Fibre Channel (FC) is an integrated set of standards developed by the American National Standards Institute (ANSI). FC allows for a switching network, called a Fabric, to intelligently manage interconnections between a number of connection points, called N_Ports. All that is required of the N_Ports is to initiate a point-to-point connection between one port and a port (F_Port) of the Fabric. However, the presence of a Fabric is not necessary, as FC provides for topologies without a Fabric, as in the case of a simple point-to-point link between two N_Ports, or a Fibre-Channel Arbitrated Loop (FC-AL).

A more complete description of the Fibre-Channel standard can be found in the proposed drafts of the American National Standard for Information Systems (ANSI), Fibre-Channel-Physical and Signaling Interface (FC-PH), Jun. 1, 1994, Rev 4.3, Fibre-Channel-Physical and Signaling Interface-2 (FC-PH-2), Sep. 10, 1996, Rev. 7.4, and Fibre-Channel Physical and Signaling Interface-3 (FC-PH-3), Aug. 19, 1997, Rev. 9.3 which are each hereby incorporated by reference in their entirety.

Communication between N_Ports is based on the transfer of data frames and Link_Control frames resulting from information transfer requests from other N_Ports. The primary function of the Fabric is to receive frames from a source N_Port and route the frames to a destination N_Port. According to the FC standard, each N_Port is assigned a locally unique physical address identifier to identify the N_Port during communication. The locally unique physical address identifier of the destination N_Port is specified in the frames to be transmitted. Each N_Port also has a permanent unique identifier that is worldwide unique. The permanent unique identifier is called a World Wide Node Name and Port Name (WWN). The locally unique physical address identifier is contained in the frame headers. The WWN is part of a group of values called service parameters. Service parameters establish the receive and transmit characteristics of an N_port. The exchange of service parameters is required for communication between N_ports.

The locally unique physical address identifiers (e.g., D_IDs and arbitrated loop physical addresses (AL_PAs)) can be dynamically assigned. For example, the FC-AL attempts to keep arbitrated loop physical addresses (AL_PAs) stable as long as no devices are added to or removed from the loop. If a device is added to or removed from the loop, one or more devices can be assigned a different arbitrated loop physical address (AL_PA). For example, two independent loops are up and running. Devices on loop #1 have acquired arbitrated loop physical addresses (AL_PAs) independent of devices on loop #2. There is a likelihood that a device on loop #1 will have the same arbitrated loop physical address (AL_PA) as a device on loop #2. The devices will attempt to reacquire the previously acquired arbitrated loop physical addresses (AL_PAs) after each loop initialization. The reacquisition of a previous arbitrated loop physical address (AL_PA) should be successful most of the time. However, if the two loops are merged without cycling power on the attached devices, conflicts can occur amongst the previously acquired arbitrated loop physical addresses (AL_PAs). As a result, the arbitrated loop physical addresses (AL_PAs) will be reassigned.

The reassignment of arbitrated loop physical addresses (AL_PAs) can cause problems for any FC-FCP (SCSI/FC) initiators communicating with devices that are FC-FCP targets. When the arbitrated loop physical addresses (AL_PAs) of the FC-FCP targets suddenly change, the initiators can loose track of the targets. For example, it is critical that drive mapping remain constant no matter what happens physically on the loop. Hot swapping a new drive onto the loop can result in a reassignment of arbitrated loop physical addresses (AL_PAs). If a Host running an operating system such as Windows NT (a trademark of Microsoft Corp.) is in the process of saving a file to Drive C, it would be undesirable for the arbitrated loop physical address (AL_PA) of Drive C to suddenly change.

A solution is needed for maintaining a persistent target mapping for a Fibre Channel Initiator between power cycles without requiring large amounts of non-volatile memory. Furthermore, a solution that maintains a persistent target mapping across an initiator power cycle when a loop has had no devices added or removed since a previous power cycling would also be desirable.

SUMMARY OF THE INVENTION

The present invention concerns an apparatus comprising a first circuit and a second circuit. The first circuit may be configured to (i) generate a sorted list of permanent unique identifiers according to predetermined criteria and (ii) associate a logical identification with a physical address identifier using the sorted list. The second circuit may be configured to manage communications between a host and a target. The second circuit may (i) communicate with the host using the logical identification and (ii) communicate with the target using the physical address identifier. The communications between the host and the target may be unaffected by changes in the physical address identifier. The function of the first circuit and/or the second circuit may be implemented, among other examples, in software and/or firmware.

The objects, features and advantages of the present invention include providing a methodology for providing persistent target identification in a fibre channel environment that may allow (i) mapping of Fibre Channel node names into a logical name table and/or (ii) Fibre Channel chips to be integrated as SCSI devices into a number of operating system environments.

BRIEF DESCRIPTION OF THE DRAWINGS

These and other objects, features and advantages of the present invention will be apparent from the following detailed description and the appended claims and drawings in which:

FIG. 1 is a block diagram illustrating a preferred embodiment of the present invention;

FIG. 2 is a flow diagram illustrating an exemplary communication path;

FIG. 3 is a flow diagram illustrating another exemplary communication path;

FIGS. 4(a)–(c) are a logic diagram illustrating methods for associating service parameters;

FIG. 5 is a flow chart illustrating a method for providing a persistent target identification according to the present invention; and FIG. 6 is a flow chart illustrating an alternative method that includes provision for a boot device.

DETAILED DESCRIPTION OF THE PREFERRED EMBODIMENTS

Referring to FIG. 1, a block diagram of a circuit 100 is shown in accordance with a preferred embodiment of the present invention. The circuit 100 may be, in one example, an FC-FCP Initiator. The circuit 100 may be connected between a host 102 and a loop (or fabric) 104. The connections between the circuit 100 and the host 102 may be, in one example, a PCI or system bus. The loop 104 may be connected to one or more target devices 106a–106n. The host 102 may be, in one example, a microprocessor (e.g., a server). The target devices 106a–106n may be, in one example, other microcomputers or mass storage devices (e.g., hard drives, CD-ROM drives, zip-drives, etc.). However, the target devices 106a–106n may be implemented accordingly as other types of network devices. The circuit 100 may be configured to manage communications between the host 102 and the target devices 106a–106n.

The circuit 100 may comprise, in one example, a circuit 108 and a circuit 110. The circuit 108 may be implemented, in one example, as a controller circuit. The circuit 110 may comprise, in one example, a memory circuit. In one example, the circuit 110 may comprise volatile and/or non-volatile memory. An input/output 112 of the circuit 108 is generally connected to an input/output 114 of the circuit 110. The circuit 108 may be configured to store service parameters received from the target devices 106a–106n in the circuit 110.

The circuit 100 may be configured to present a signal (e.g., a Logical Identification (LID)) to the host 102 for each FC-FCP target device 106a–106n connected to the loop 104. The circuit 100 may be configured to associate an LID to a permanent unique identifier of each target device 106a–106n. The permanent unique identifier may be, in one example, a World Wide Node Name (e.g., WWN) of the target devices 106a–106n. However, other permanent identifiers that are unique world wide (e.g., a World Wide Port Name) may be used. The circuit 100 may be further configured to associate the LID of each of the target devices 106a–106n to a physical address identifier of each of the target devices 106a–106n. The physical address identifier may be, in one example, an arbitrated loop physical address (AL_PA) or a D_ID. The circuit 100 may be configured to maintain the associations between LIDs and physical address identifiers such that the physical address identifiers may change value without loss of association to a particular LID.

The circuit 100 may be configured, in one example, to hard map the WWNs and physical address identifiers of the target devices 106a–106n. During a target discovery phase following power up, the circuit 100 may interrogate the loop(fabric) 104 to determine the connected targets 106a–106n. The targets 106a–106n may respond by sending frames of information (e.g., service parameters). The frames will generally have a header that may contain the physical address identifier of the sending target. The service parameters sent as part of the response frame will generally include the WWN of the sending target.

The circuit 100 may be configured, in one example, to generate a sorted list of the received WWNs according to predetermined criteria (e.g., ascending order). The circuit 100 may generate associations between the WWNs and the corresponding physical address identifiers (e.g., memory pointers linking a WWN and a physical address identifier of a particular target and vice versa). The circuit 100 may be further configured to assign a LID to each WWN according to predetermine criteria (e.g., position in the sorted list) and generate associations between each assigned LID and a physical address identifier (e.g., memory pointers linking a LID to a physical address identifier and vice versa) using the associations between (i) LIDs and WWNs and (ii) WWNs and physical address identifiers. The WWNs of the 106a–106n devices are permanent and unique throughout the world. Since the associations are referenced to the WWNs of the target devices 106a–106n, changes in the physical address identifiers of the target devices 106a–106n will generally not affect the associations. For example, if a target device is physically moved, the target may send a frame of information announcing the physical change. The frame will generally contain a new physical address identifier in the header and the WWN of the target in the information of the frame. The circuit 100 may use the new physical address identifier to update the physical address identifier currently associated with the WWN that was contained in the frame. Since a particular LID and WWN are generally associated with the same physical address identifier, updating the physical address identifier associated with a particular WWN generally has the effect of maintaining the association between a LID and a particular device in a manner that is generally independent of the physical address of the device.

Referring to FIG. 2, a flow diagram illustrating an exemplary communication path is shown. The associations between a LID and a physical address identifier of a particular target device 106i may be used to facilitate communication with the particular target device. The communication with the particular target device 106i is generally unaffected by a change or a lack of change in the physical address identifier of the particular target device. The host 102 generally sends communications to the target devices 106a–106n using the LID associated with a particular target device 106a–106n to identify the destination device. The circuit 100 generally uses the LID to look up the physical address identifier of the destination device. The circuit 100 generally sends the communication received from the host 102 to the loop/fabric 104 with the destination device identified by the physical address 19 identifier. The circuit 100 generally manages communications from the target device 106i in a similar but reverse manner. The communications from the target device 106i generally uses the physical address identifier of the particular target device 106i. The circuit 100 generally translates the physical address identifier to the associated LID for the particular target device 106i. The communication from the target device 106i is then sent on to the host 102 with the LID of the particular target device as the identification of the source.

Referring to FIG. 3, a flow diagram illustrating another exemplary communication path where a target has more than one physical address identifier. The circuit 100 may be configured to select the physical address identifier used to communicate with the target device 106i.

Referring to FIGS. 4(a)–(c), logic diagrams illustrating exemplary methods of associating the LIDs, WWNs, and physical address identifiers are shown. The memory space of the circuit 110 may be used for storing and associating the LIDs, WWNS, and physical address identifiers in accordance with the present invention. FIG. 4(a) illustrates an example where the circuit 108 may add the LID for a particular target device 106a–106n to a service parameter block of the particular target device. FIG. 4(b) illustrates an example where the circuit 108 may maintain a list of LIDs and a list of service parameter blocks 120a–120n. The LIDs may be associated to the respective WWN using address pointers to the respective service parameter block. FIG. 4(c) illustrates an example where the circuit 108 may maintain separate lists for the LIDs, the WWNs, and the service parameter blocks 120a–120n that may contain the physical address identifiers. Address pointers may be used to form the associations between the LIDs, the WWNs, and the physical address identifiers. However, other methods of forming the associations may be implemented to meet the design criteria of a particular application.

Referring to FIG. 5, a flow chart of an example start up (e.g., loop initialization) operation of the circuit 100 is shown. Upon power up or loop initialization, the circuit 100 generally runs through a process to discover all target devices 106a–106n connected to the loop/fabric 104 (e.g., block 200). The target devices 106a–106n are generally sorted by WWN (e.g., block 202) and assigned LIDs relevant to the sorted order of the WWNs (e.g., block 204). The LID to WWN mappings generally remain constant between power cycles of the circuit 100, regardless of the WWN to physical address identifier relationships. When a new target device 106a–106n is added to the loop (e.g., yes path of block 206), the WWN of the new target device is generally not sorted into the list. The WWN of the new target device is generally appended to the end of the sorted list of WWNs (e.g., block 208). An unused LID is generally associated with the WWN and the physical address identifier of the new target device (e.g., block 210).

In the example mentioned above, where two independent loops are merged together, all LID to WWN mappings in the circuit 100 of the initial loop will generally remain unchanged, and unused LIDs will generally be assigned to the targets on the loop being merged in, regardless of any physical address identifier changes that might take place.

In addition, LID to WWN mappings will generally remain constant across Initiator power cycles as long as no target devices 106a–106n are added to or removed from the loop 104. The WWNs of the target devices 106a–106n connected to the loop 104 are generally sorted to handle the case where (i) no target devices were added to or removed from the loop 104 and (ii) physical address identifiers have changed due to target devices having been physically moved or other initiators added to or removed from the loop 104. The LID to WWN mappings will generally remain unchanged. Since the WWN is generally used to associate the LIDs and the physical address identifiers of the target devices 106a–106n, the LID to target mapping will generally also remain unchanged regardless of a physical address change.

Referring to FIG. 6, a flow chart illustrating an alternative method that may provide a fixed LID for one or more devices, including a boot device, is shown. An alternative embodiment of the present invention may allow for one or more devices, that may include a boot device, to persistently regain the same LID. The circuit 100 may comprise a small amount of non-volatile memory. The LID and WWN of one or more devices, including the boot device, may be stored in the non-volatile memory. The LID and WWN of a boot device will generally be stored in the non-volatile memory before any other device. After the circuit 100 has (i) powered up (e.g., block 300) and (ii) discovered and sorted the WWNs of the target devices 106a–106n (e.g., blocks 302 and 304), the WWNs and the desired LIDs may be read from the non-volatile memory (e.g., block 306). The WWNs from the non-volatile memory may be inserted into the sorted list at a position determined by the corresponding LID from the non-volatile memory (e.g., block 308). The process of adding new target devices 106a–106n is generally similar to the process described in connection with FIG. 3 (e.g., blocks 312–316). The host 102 is generally able to boot using a particular target device on the loop 104, regardless of new target devices 106a–106n being added to or removed from the loop 104. The amount of non-volatile memory may be adjusted to balance the number of fixed LIDs and cost.

Although the present invention finds particular application in a Fibre Channel environment, it is not limited thereto. The method according to the present invention is applicable to any computing system, environment or standard where each target device of the system is assigned a unique permanent identifier, and must exchange that permanent identifier with other target devices of the system in order to exchange information. The present invention is applicable to any environment in which information, whether called login service parameters, WWNs or some other names, regarding particular devices and modules must be exchanged before communication can take place.

The function performed by the circuit 100 of FIG. 1 and or described in the flow diagrams of FIGS. 5 and 6 may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s).

The present invention may also be implemented by the preparation of ASICs, FPGAs, or by interconnecting an appropriate network of conventional component circuits.

The present invention thus may also include a computer product which may be a storage medium including instructions which can be used to program a computer to perform a process in accordance with the present invention. The storage medium can include, but is not limited to, any type of disk including floppy disk, optical disk, CD-ROM, and magneto-optical disks, ROMs, RAMs, EPROMS, EEPROMS, Flash memory, magnetic or optical cards, or any type of media suitable for storing electronic instructions.

While the invention has been particularly shown and described with reference to the preferred embodiments thereof, it will be understood by those skilled in the art that various changes in form and details may be made without departing from the spirit and scope of the invention. For example, the present invention may be implemented along with one or more portions of U.S. Pat. No. 5,956,723, which is hereby incorporated by reference in its entirety.

What is claimed is:

1. An apparatus comprising:

a first circuit configured to (i) store a sorted list of physical address identifiers of one or more target devices in a volatile storage medium, said list being sorted by permanent unique identifiers of said one or more target devices such that a position of each of said physical address identifiers in said list remains constant across power cyclings of said apparatus as long as said one or more target devices are unchanged and (ii) associate a logical identification with each physical address identifier of said sorted list; and a second circuit configured to (i) couple a host to said one or more target devices, (ii) obtain said permanent unique identifiers and physical address identifiers of said one or more target devices and generate said sorted list, (iii) communicate with said host using said logical identification and (iv) communicate with said one or more target devices using said physical address identifiers, wherein said communications between said host and said one or more target devices are unaffected by changes in said physical address identifier.

2. The apparatus according to claim 1, wherein said apparatus comprises a Fibre Channel initiator.

3. The apparatus according to claim 1, wherein said first circuit further comprises non-volatile memory.

4. The apparatus according to claim 3, wherein said non-volatile memory contains said logical identification and said permanent unique identifier of one or more of said target devices.

5. The apparatus according to claim 1, wherein said permanent unique identifier comprises a World Wide Node Name.

6. The apparatus according to claim 1, wherein said position in said list remains unchanged when said physical address identifier changes.

7. The apparatus according to claim 1, wherein said one or more target devices comprise an FC-FCP device.

8. The apparatus according to claim 1, wherein said physical address identifiers comprise one or more of an arbitrated loop physical address (AL_PA) and a destination address (D_ID).

9. The apparatus according to claim 1, wherein said first circuit comprises a volatile memory, wherein said logical identification, said permanent unique identifiers, and said physical address identifiers are stored and associated by memory pointers.

10. The apparatus according to claim 1, wherein said apparatus is connected to said one or more target devices by a Fibre Channel Arbitrated Loop (FC-AL).

11. The apparatus according to claim 1, wherein said apparatus is connected to said one or more target devices by a Fibre Channel Fabric to Loop Attachment (FC-FLA).

12. An apparatus comprising:
   means for (i) storing a sorted list of physical address identifiers of one or more target devices in a volatile storage medium, said list being sorted by permanent unique identifiers of said one or more target devices such that a position of each of said physical address identifiers in said list remains constant across power cyclings of said apparatus as long as said one or more target devices are unchanged and (ii) associating a logical identification with each physical address identifier of said sorted list; and
   means for (i) coupling a host to said one or more target devices, (ii) obtaining said permanent unique identifiers and physical address identifiers of said one or more target devices and generating said sorted list, (iii) communicating with said host using said logical identification and (iv) communicating with said one or more target devices using said physical address identifiers, wherein said communications between said host and said one or more target devices are unaffected by changes in said physical address identifiers.

13. A method for providing persistent logical identification and communication in a network environment comprising the steps of:
   (A) storing a sorted list of physical address identifiers of one or more target devices in a volatile storage medium, wherein said list is sorted by permanent unique identifiers of said one or more target devices such that a position of each of said physical address identifiers in said list remains constant across power cyclings of said apparatus as long an said one or more target devices are unchanged and a logical identification is associated with each physical address identifier of said sorted list; and
   (B) (i) coupling a host to said one or more target devices, (ii) obtaining said permanent unique identifiers and physical address identifiers of said one or more target devices and generating said sorted list, (iii) communicating with said host using said logical identification and (iv) communicating with said one or more target devices using said physical address identifiers, wherein said communications between said host and said one or more target devices are unaffected by changes in said physical address identifiers.

14. The method according to claim 13, wherein step A comprises the sub-steps of:
   (A-1) retrieving said permanent unique identifiers and corresponding physical address identifiers from one or more targets in said environment;
   (A-2) generating said sorted list of said permanent unique identifiers according to said predetermined criteria;
   (A-3) associating said logical identification to each of said permanent unique identifiers;
   (A-4) associating said logical identification to said corresponding physical address identifiers of said permanent unique identifiers; and
   (A-5) when one or more new targets are added to said environment, appending a permanent unique identifier of each of said one or more new targets to said sorted list, associating an unused logical identification to each appended permanent unique identifier and corresponding physical address identifier of said one or more new targets.

15. The method according to claim 13, wherein each of said permanent unique identifiers comprises a World Wide Node Name.

16. The method according to claim 13, wherein each of said physical address identifiers changes.

17. The method according to claim 13, wherein said network comprises a Fibre Channel Arbitrated Loop (FC-AL).

18. The method according to claim 13, wherein said network comprises a Fibre Channel Fabric to Loop Attachment (FC-FLA) standard network.

19. The method according to claim 13, wherein the association of said logical identification to one of said physical address identifiers is based on a position of a corresponding one of said permanent unique identifier in said sorted list.

20. The method according to claim 14, further comprising the sub-steps of:
   (A-2a) reading a permanent unique identifier and a logical identification of one or more target devices from a non-volatile memory; and
   (A-2b) inserting said permanent unique identifier of said one or more target devices into a position in said sorted list such that said permanent unique identifier of said one or more devices is associated with the same logical identification as was retrieved from said non-volatile memory.

21. The apparatus according to claim 1, wherein said association between said logical identification and each of said physical address identifiers is persistent between power cyclings of said apparatus.

22. The apparatus according to claim 1, wherein said association between said logical identification and each of said physical address identifiers is persistent across a power cycling of said apparatus when no target devices have been added or removed since a previous power cycling.

* * * * *